United States Patent [19]

Custers et al.

[11] Patent Number: 5,063,547
[45] Date of Patent: Nov. 5, 1991

[54] APPARATUS FOR AUTOMATICALLY REPRODUCING A USER-DEFINED PREFERRED SELECTION FROM A RECORD CARRIER

[75] Inventors: Pieter H. Custers, Eindhoven, Netherlands; Ludo M. J. Stulens, Hasselt, Belgium

[73] Assignee: U.S. Philips Corporation, New York, N.Y.

[21] Appl. No.: 559,444

[22] Filed: Jul. 20, 1990

Related U.S. Application Data

[63] Continuation of Ser. No. 221,685, Jul. 20, 1988, abandoned, which is a continuation-in-part of Ser. No. 745,558, Jun. 17, 1985, Pat. No. 4,779,252.

[30] Foreign Application Priority Data

Jul. 2, 1984 [NL] Netherlands .......................... 8402095
Oct. 21, 1987 [NL] Netherlands .......................... 8703086

[51] Int. Cl.$^5$ ................................................ G11B 7/00
[52] U.S. Cl. ......................................... 369/32; 369/48
[58] Field of Search ................. 360/72.2, 132; 369/30, 369/32, 48, 50

[56] References Cited

U.S. PATENT DOCUMENTS

| | | | |
|---|---|---|---|
| 4,766,581 | 8/1988 | Korn et al. | 369/30 |
| 4,779,252 | 10/1988 | Custers et al. | 369/32 |
| 4,852,073 | 7/1989 | Shinohara et al. | 369/32 |

FOREIGN PATENT DOCUMENTS

| | | |
|---|---|---|
| 8601631 | 3/1986 | European Pat. Off. |
| 0265167 | 4/1988 | European Pat. Off. |
| 2517863 | 10/1983 | France |

OTHER PUBLICATIONS

Netherlands Search Report Dated Sep. 28, 1988.

*Primary Examiner*—Donald McElheny, Jr.
*Attorney, Agent, or Firm*—Leroy Eason

[57] ABSTRACT

A Compact-Disc Digital Audio player in which different users, independently of one another, can store preferred selections of specific discs in a memory. The player is adapted to identify the disc from the sub-code on the disc. In addition, a user identification can be entered in the player. The user identification and the record carrier identification are combined to form one identification code. Further, the player is adapted to detect whether for said identification code a preferred-selection program is stored in the memory and, if this is the case, to reproduce the relevant information from the disc in the sequence specified by the preferred-selection program.

3 Claims, 3 Drawing Sheets

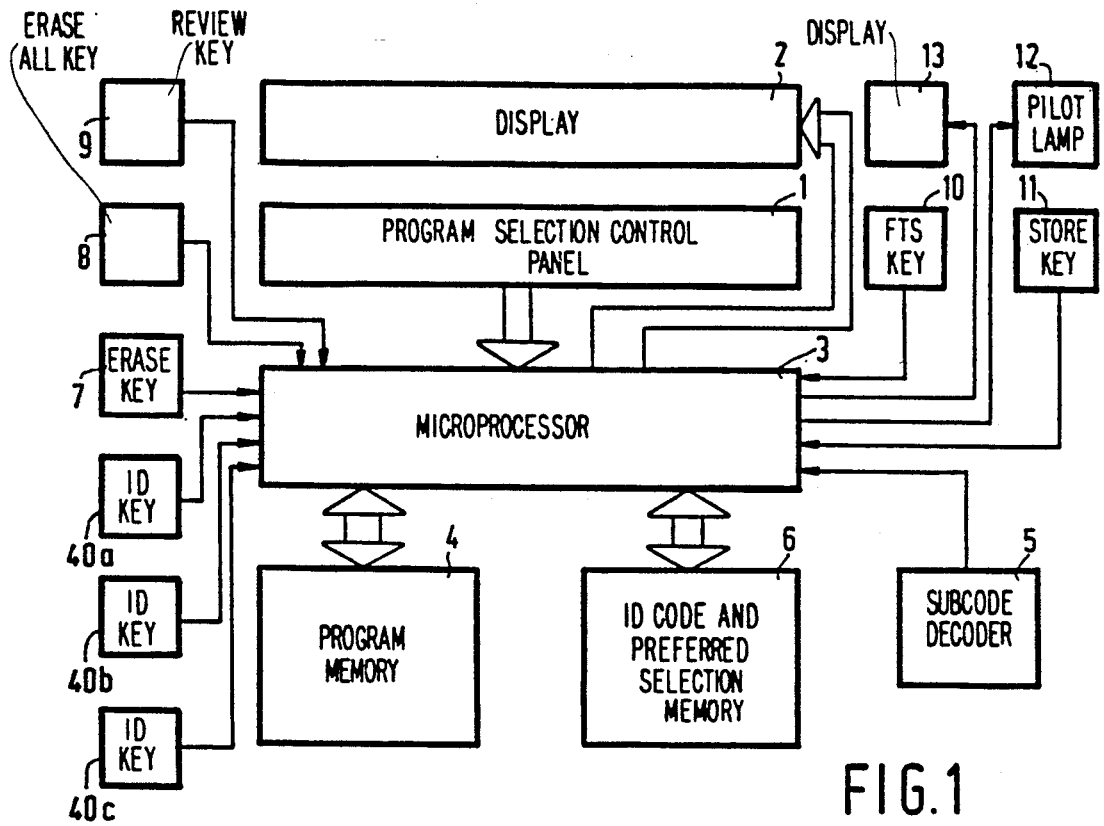
FIG.1
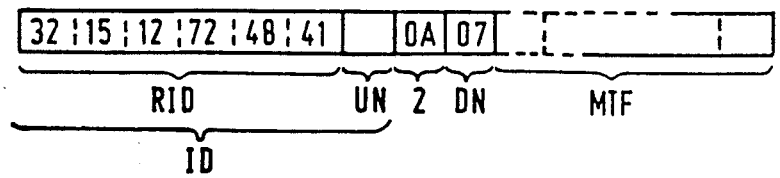
FIG.2
FIG.3

APPARATUS FOR AUTOMATICALLY REPRODUCING A USER-DEFINED PREFERRED SELECTION FROM A RECORD CARRIER

CROSS REFERENCE TO RELATED APPLICATION

This is a continuation of application Ser. No. 221,685, filed July 20, 1988, now abandoned which was a continuation-in-part of application Ser. No. 745,558 filed on June 17, 1985, now U.S. Pat. No. 4,779,252 issued Oct. 18, 1988.

BACKGROUND OF THE INVENTION

The invention relates to an apparatus for reading information stored on a record carrier, comprising means for reading the record carrier, means for controlling the reading means, identification means for detecting a record-carrier identification of a record carrier before it is played, storage means for storing the record carrier identifications together with the corresponding preferred-selection programs for a plurality of record carriers, selection means responsive to the detected record-carrier identification to select or not to select a preferred-selection program stored in the storage means, and means for setting the control means in such a way that parts of the information are read in the sequence defined by the selected preferred-selection program. Such an apparatus is known from Netherlands Patent Application no. 8402095 and corresponding U.S. Pat. No. 4,779,252 issued Oct. 18, 1988 (PHN 11.078). In the apparatus described therein a user can enter a preferred selection in the memory of the apparatus. This preferred selection together with the record carrier identification is stored in the memory. If subsequently the same record carrier is to be played on the apparatus, the preferred selection thus stored will be reproduced from the record carrier if this is indicated by actuation of an appropriate key. The apparatus then ascertains whether the identification of the relevant disc is stored in the memory. If it is, the associated preferred selection is reproduced from the record carrier. However, the apparatus has the disadvantage that only one preferred selection can be stored for each record carrier. This is a disadvantage, in particular if the same apparatus is to be used by different persons. Indeed, in the case of several users it may be desirable that each user, independently of the other users, can play his personal preferred selection from the record carrier.

It is the object of the invention to provide an apparatus of the type defined in the opening paragraph, which mitigates the above problem.

SUMMARY OF THE INVENTION

According to the invention this object is achieved in that the apparatus comprises means for entering a user identification, the storage means being adapted to store, for at least one specific record carrier identification, a plurality of preferred-selection programs associated with different user identifications in such a manner as to define the relationship between the user identification and the associated preferred-selection program, the selection means being adapted to detect whether for the combination of the detected record carrier identification and the entered user identification a preferred-selection program is stored in the storage means and to select said preferred program if the presence of such a program is detected.

One embodiment of the apparatus comprises means for combining the user identification and the record-carrier identification to form an identification code, the storage means being adapted to store the identification codes together with the associated preferred-selection program. This embodiment has the advantage that for selection of preferred programs use can be made of the selection software already available in the apparatus, so that a rapid and reliable adaptation is possible.

A further embodiment of the apparatus for reproducing audio information encoded in conformity with the "Compact Disc Digital Audio" standard is characterized in that the identification means receive the sub-code and are adapted to derive the record-carrier identification from those bytes of the index contained in the sub-code which indicate the beginning of the information parts in frames and in seconds, the combination means being adapted to insert bits of the user identification at unused bit positions of the selected bytes.

This embodiment advantageously utilizes the fact that in the bytes representing the seconds and frames not all the available bit positions are used. Indeed, the maximum value of the frame number is 75 and the maximum number of seconds to be indicated is 60, which means that in the 8-bit bytes indicating the frame number one bit position is not used and in the 8-bit bytes indicating the seconds two bit positions are not used. By inserting the bits of the user identification at the unused bit positions the length of the identification code remains equal to that of the record carrier identification, which renders the adaptation of the existing apparatus very simple.

BRIEF DESCRIPTION OF THE DRAWING

The invention will now be described in more detail with reference to the accompanying drawings, in which:

FIG. 1 shows schematically an embodiment of the invention,

FIG. 2, 3 and 5 are diagrams to explain the invention,

DETAILED DESCRIPTION OF THE INVENTION

Figure 4:
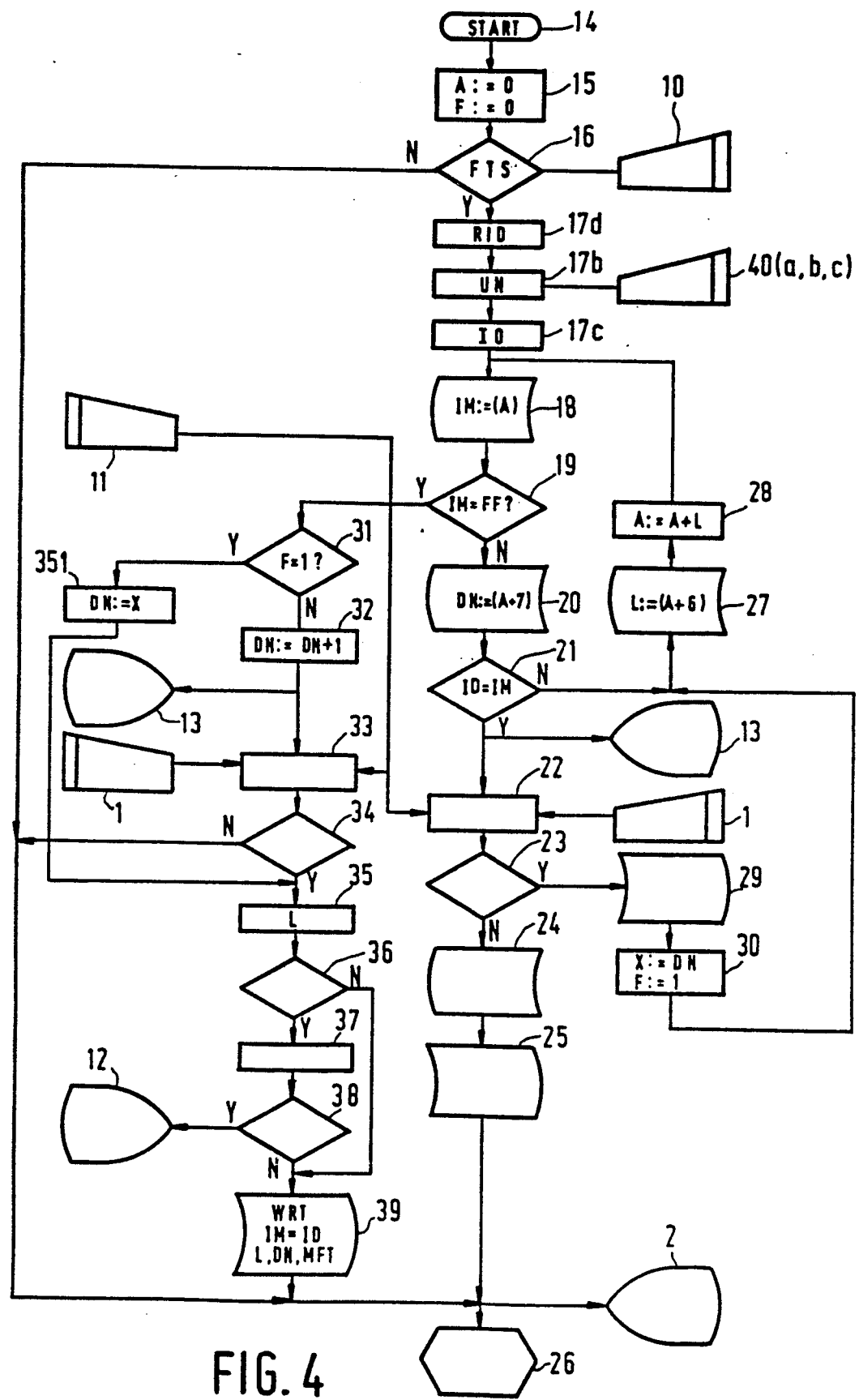
FIG. 4 is a flow chart to explain the programming of the microcomputer 3 used in the embodiment shown in FIG. 1.

FIG. 1 shows the block diagram of a compact disc player in so far as it is relevant to the present invention. The description is based on known commerically available compact-disc players, such as for example the player which is available from N.V. Philip's Gloeilampenfabrieken under the type number CD 304. These known players comprise a program selection control panel 1, for example a row of keys which each correspond to a specific track number, and a display 2 which displays the selected choice, for example a row of lights which each correspond to a specific track number. Apart from the possibility of programming a track-number selection it may also be possible to make a selection by index (parts of tracks), time within a track number, or absolute time. A microcomputer 3 i.e. a microprocessor, scans the control panel 1 and drives the display 2. Further, the microcomputer 3 can store the program selection made in, and read it from, a program memory 4 to control the player in such a way that the selected items on the disc to be played are reproduced. For this purpose the microcomputer 3 receives a subcode from a subcode decoder 5, which subcode is contained in the music data on the disc and is a running code representing inter alia track numbers, index and time, so that the microcomputer receives information about the location on the disc being reproduced.

The player has the possibility of storing preferred program selections of a plurality of discs in a memory, identifying, discs to be played and, if desired, playing the preferred program selection. For this purpose the microcomputer 3 is programed to derive a disc identification code RID from the subcode supplied by the decoder circuit 5. The disc identification code RID may be, for example, a catalog number contained in this subcode or an indication of a composer, performer, title etc., but at least to date this data is not contained in the subcodes of all discs. Therefore, it is more advantageous to derive a disc-identification code RID from data present on every disc. One possibility is to select specific bit groups from the index table present on every disc, which table is shown schematically in FIG. 2, This index table comprises serial data in the form of groups of 4 bytes (4×8 bits) represented in hexadecimal notation in FIG. 2. The first byte of every group represents the track number, the second, the third and the fourth byte the time after the beginning of the disc at which said track starts, expressed in minutes (2nd byte), seconds (3rd byte), and frames (4th byte), one frame being equal to 1/75 second. The index of all the track numbers is followed by three 4-byte code blocks whose first bytes are A0, A1 and A2 respectively. The second byte of the block with the initial byte A0 represents the number of the first track on the disc to be played, which number need not necessarily be one because a continuous sequence of numbers may be assigned to a plurality of discs. The third and the fourth byte of this group are both 00. The group with the initial byte A1 in a similar way represents the number of the last track in the second byte, and the third and the fourth byte are 00. The group with the initial byte A2 represents the time from the beginning of the leadout track in minutes, seconds and frames in the second, the third and the fourth byte, respectively.

The number of minutes and seconds of the first track number are not arbitrary. The number of frames (4th byte) is generally more or less arbitrary and is selected as the first byte of the disc-identification code RID. Both the number of seconds and the number of frames of the second track may be regarded as more or less arbitrary and therefore these two bytes have been selected as the second and the third byte of said disc-identification code RID, said bytes being for example 00 if the disc contains only one track. The second hexadecimal half of the second byte of the group with the initial byte A1 together with the second hexadecimal half of the second byte of the last group may be selected to form together the fourth byte of the disc identification code RID. The fifth and the sixth byte of this code are constituted by the last two bytes of the last group which indicate the number of seconds and frames from the beginning of the lead-out track. In FIG. 2 the selected bytes have been encircled and together with the selected numerical examples they constitute the hexadecimal code 32-15-12-72-48-41. In practice, the resulting disc identification code RID may be regarded as a unique code. In this respect it is to be noted that a disc identification code RID may be derived from the information to be reproduced instead of from a subcode which is not necessarily present.

The disc identification code RID described with reference to FIG. 2 is derived from the subcode supplied by the decoder circuit 5 by suitably programming the microcomputer 3. The disc identification code RID is combined with a user identification code which can be entered into the microcomputer 3 by means of the identification keys 40a, 40b, 40c. The identification code ID thus obtained, together with the preferred selection, is stored in the memory 6. This information should be preserved in the memory 6 also after the player has been switched off, for example by the use of battery-powered RAM memories or non-volatile memories. In the first case the required storage capacity hardly affects the price and it is possible to select an organization such that a specific storage capacity is reserved for each disc-selection number (this is a sequence number assigned to a disc whose preferred selection has been stored), which capacity should be large enough to store a maximum number of selected tracks. In the case of non-volatile memories the storage capacity is still a factor which must be taken into account.

In order to enable the preferred selections of a maximum number of discs to be stored a memory organization is then preferred which no excess storage capacity is reserved. All the selections made are then stored directly after each other. Random access to the memory is then no longer possible because the various identification codes are no longer stored at fixed addresses. The memory is filled contiguously, a code being assigned to each block, which code indicates the length of this block and enables the address of each subsequent block to be computed. FIG. 3 shows an example of such a block. The first six bytes of the block comprise the disc identification code RID; the seventh byte contains the user identification code UN; the next byte is an indication of the location L of the next block, which is achieved in the present example by indicating the length of the block; the following byte indicates the sequence number DN of the relevant disc within the selection of discs in conformity with the preference laid down by the user. This sequence number makes it easier for the user to keep a "record", for example by marking the sleeve of the disc with this sequence number. Finally, the block comprises a variable number of bytes MFT representing the selection made by the user. Since this selection can be made in different ways, it may be required to have bits which indicate the type addressing (track numbers, index or time) and merging bits. Alternatively, the various types of addressing may be combined. Examples of these are:

- track-number addressing. This demands one byte per choice.
- index-addressing within specific tracks. This requires two bytes per choice, namely one for the track number and one for the index.
- time within the selected track, which requires 5 bytes, namely one for the track number, two for the starting time (mins.; sec,) and two for the ending time,
- absolute-time selection, which requires four bytes, namely two for the starting time and two for the ending time.

In order to indicate the last block stored in last block is encoded in a predetermined manner, for example in hexadecimal notation with FF. The next new block may then be stored at this location if the storage capacity of the memory allows this.

If a block is cancelled, for example by erasing a block or by re-selection of a program for a disc for which a selection has been made previously, which new selection cannot always be accommodated within the storage location occupied by the previous selection, this can be indicated by filling the location for the ID code with a code which indicates that this block is not valid and must be skipped. The cancelled blocks are used again by shifting the information when the memory is full. This is done because in specific types of non-volatile memories erasing and writing reduces the lifetime and demands a comparatively long time. If these drawbacks do not exist the cancelled blocks may be filled immediately by shifting the next blocks. An alternative for the cancellation of a block in the case of re-entry is to enter the new selection at the location of the old selection and, if the storage area is not adequate, to store a pointer which refers to the location where the remainder of the information is stored.

When a re-entry at the end is selected either the old sequence number may be maintained or the next number of the sequence may be chosen.

In the example described here the sequence number is maintained.

Figure 5:
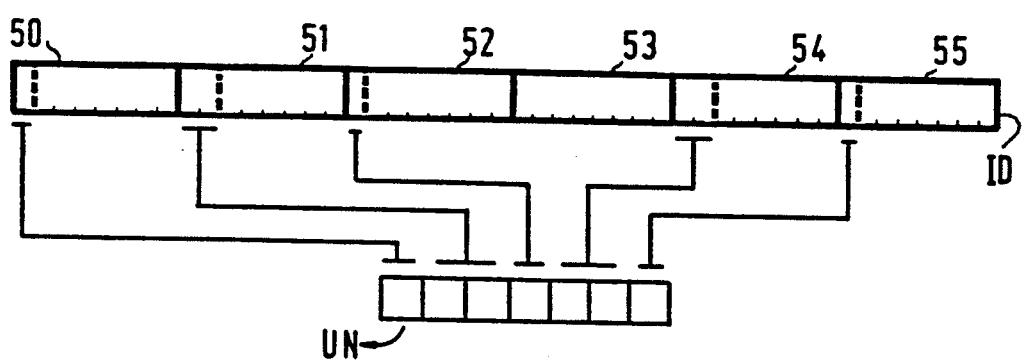

FIG. 5 shows another method of combining the disc identification code and the user identification code UN. Here, use is made of the fact that a number of bits within the bytes in the disc identification code representing a time in seconds or a number of frames are not utilized. This is because the maximum values of the bytes representing the seconds and frames cannot exceed 60 and 75 respectively. If, as in the embodiment described in the foregoing, this value is represented by a binary code, this means that the most significant bits of the bytes indicating the frames are not used. In the bytes indicating the seconds the two most significant bits are not used, so that in total seven unused bits are available in the disc identification code RID. These bits may be used for user identification. If as is shown in FIG. 2 the disc identification code RID comprises six bytes, of which the first byte 50, the third byte 52 and the sixth byte 55 indicate the frame number of the starting positions of the first music track, the third music track and the lead-out track respectively and of which the second and fifth bytes represent the seconds of the starting position indications of the second music track and the lead-out track respectively. This means that the disc identification code RID has seven unused bit positions, which is amply sufficient for a user identification code UN, as is illustrated in FIG. 5. This has the advantage that the ultimately obtained identification code ID is not longer than the disc identification code RID.

With respect to control and display special provisions may be made for keying in the selection made and for displaying this selection, but it is advantageous to employ the keyboard 1 and the display 2.

In addition, the following functions (shown schematically in FIG. 1) may be provided:

An erase key 7 by means of which a specific block in the preferred-selection memory can be invalidated when the sequence number of said block is also keyed in.

An erase-all key 8 for erasing the entire preferred-selection memory in the case of a reorganization by the user. This key 8 must be protected to preclude inadvertent erasure of the program, which can be achieved if several operations have to be performed for such an erasure.

A review key 9 which enables the user to check the entire contents of the preferred-selection memory by displaying the sequence numbers with corresponding programs in a specific rhythm in numerical order of the sequence numbers.

An FTS key 10 by means of which the user can choose between reproduction of the preferred selection and the storage of a preferred selection.

A store key 11 which enables the selection made to be keyed in via the keyboard 1.

A pilot lamp 12 which indicates when the preferred-selection memory is full (or, as an alternative, another display may be caused to blink), and A display 13 which displays the sequence number of the identified disc or the disc number to be stored and, if applicable, the user identification.

FIG. 4 is the flow chart of the programming of the microcomputer 3 in a preferred embodiment of the invention.

In block 14 the program is started, for example by putting on a disc. Subsequently, a number of parameters are initialized in block 15, such as the parameters A which indicate the address in the preferred-selection memory 6 and F which is a flag which is used in the program. Block 16 is a test to ascertain whether the user wishes to make use of the possibility of reproducing the preferred selection or wishes to employ the programming facility, for which purpose the position of the FTS key 10 is scanned. If the user does not wish to use the preferred-selection facility, the program proceeds directly to block 26 to play the disc in the customary manner, as the case may be with a single selection via the keyboard 1, which program choice is stored in the program memory 4. If the user wishes to use the preferred-selection facility the disc identification code RID of the disc is determined in block 17a in accordance with the rules described with reference to FIG. 2. Subsequently in block 17b the user identification UN is read in. This is possible, for example by ascertaining which of the identification keys 40 has been depressed and by assigning a user identification depending on the actuated key. The number of different user identifications is then equal to the number of identification keys, i.e. three in the present embodiment. However, this number may readily be extended. If the number of user identifications is large, it is preferred to enter the user identification UN via a digital keyboard.

After entry of the user identification UN, this user identification UN and the disc identification code RID are combined to form the identification code ID in conformity with the rules described with reference to FIGS. 3. However, in the following description it is assumed that the identification code has a length of 6 bytes, as illustrated in the Figure. In block 18 the identification code is now read out of the preferred-selection memory 6 at address A which has been initialized in block 15, i.e. for the first time at the first location in the memory. For the sake of clarity the identification codes stored in the memory are referred to as "IM" instead of "ID". Subsequently, block 19 as a check whether the code IM is identical to the code FF which indicates that the memory does not contain any further preferred selections. If this is not the case the sequence number DN of the disc is read out at the address A+7 bytes in block 20. After this, the test in block 21 ascertains whether the read-out disc-identification code IM corresponds to the identification code ID of the disc to be played. If this is not the case, the length L of the block (see FIG. 3) at 6 bytes after address A is read out in block 27 and subsequently the address is incremented by said length L in block 28, after which the program returns to block 18.

Leaving the loop 18-19-20-21-27-28 is possible in two ways: either the specific disc code is not contained in the memory, in which case the loop is left via block 19, or the disc code is stored, in which case an affirmative answer to the question ID =IM is obtained in block 21. The sequence number DN found in block 20 is then displayed by the display 13 as a sign that the disc to be played has the said sequence number and as a sign that reprogramming is possible if the user wishes to do so. Then a waiting time is observed in block 22 while the store key and the keyboard 1 are interrogated to allow the user to reprogram. Subsequently, it is ascertained in block 23 whether reprogramming has been effected. If reprogramming has taken place an invalidation code is entered at address A in block 29 as a sign that the relevant preferred selection has become invalid. Subsequently, in block 30 the sequence number of the disc is stored by means of a parameter X and the flag F is set: =1) and the program returns to the search loop 18-19-20-21-27-28 in block 27 to leave said loop via block 19 after the last preferred selection. If no reprogramming is detected in block 23, the program proceeds to block 24 in which at an address 8 bytes after address A the preferred selection MFT corresponding to the loaded disc is read out of the memory 6, after which this preferred selection is stored in the program memory 4 in block 25. The program is then completed in block 26, the program in the memory 4 being displayed by the display 2. This program may have been obtained by reading out the preferred-selection memory 6 or by programming without preferred selection (output "N" in block 16).

If the identification number ID does not correspond to one of the identification numbers stored in the preferred-selection memory or if reprogramming is to be effected, block 19 is left via output "Y", to proceed to block 31 where the flag F is tested (F=1). If this is not the case, the disc is a disc whose identification number has not been stored in the memory and—since the FTS key 10 has been actuated—which is to be stored as a preferred selection. For this purpose a waiting time is observed in block 33 while the keyboard and the store key 11 are scanned, to allow the user to key in the program, and the sequence number to be assigned to the disc being displayed by the display 13. The last sequence number read (see block 20) is therefore incremented by one in block 32. After this, it is ascertained in block 34 whether programming has been effected, to proceed directly to block 26 if this should not be the case.

If the test F=1 in block 31 is found to be true (output Y), the disc is a disc whose preferred selections have been reprogrammed (in block 22). In accordance with block 351 the sequence number DN is the value stored in block 30, i.e. the value of the sequence number at the original location in the memory, after which the program proceeds to output Y of block 34. At this point in the program the address in the preferred-selection memory 6 is the next address after the last preferred-selection block and the values to be stored of the sequence number DN, the disc identification code and the preferred-selection program MFT are known. For this storage the length of the new block is determined in block 35 and in block 36 it is ascertained whether the storage capacity is still sufficient for this block. If the storage capacity is still sufficient the program proceeds to block 39 to store the values of IM, DN and MFT in the preferred-selection memory 6 and subsequently, the program proceeds to block 26 in order to carry out the preferred program indicated by means of the keyboard 1 or to remove the disc, or to carry out another program which should not be stored in the preferred-selection memory. If block 36 shows that the storage capacity is not sufficient, the memory is re-organized in block 37 by shifting the preferred-selection blocks in such a way that invalidated blocks (see block 29) are overwritten. After this it is checked again in block 38 whether the storage capacity is sufficient. Should this not be the case the pilot lamp 12 is energized and in the other case the program proceeds to block 39 to carry out the further program already described.

By means of the apparatus in accordance with the invention described in the foregoing a number of users can make their own preferred selections independently of one another owing to the use of different user identifications, after they have first entered the user identifications assigned to them.

In the embodiment described in the foregoing the record carrier identification code RID is combined with the user identification UN to form the identification code ID. The identification codes together with the preferred programs are stored in the preferred selection memory 6. However, it is to be noted that the invention is not limited to this embodiment. For example, it is also possible to allocate a predetermined part of the memory to each user identification. Searching for the presence of preferred selections is then effected only in the part of the memory allocated to the user identification. Moreover, other storage methods than described in the foregoing may be used, provided that the method of storage always defines the relationship between the preferred selections and the corresponding user identification.

What is claimed is:

1. An apparatus for reading information stored on a record carrier, comprising: reading means for reading the record carrier, means for controlling the read means, identification means for detecting a record-carrier identification of a record carrier before it is played, storage means for storing the record carrier identifications together with the corresponding preferred-selection programs for a plurality of record carriers, selection means responsive to the detected record carrier identification to select or not to select a preferred-selection program stored in the storage means, and means for setting the control means in such a way that parts of the information are read in the sequence defined by the selected preferred-selection program, characterized in that the apparatus comprises means for entering a user identification, the storage means being adapted to store, for at least one specific record-carrier identification, a plurality of preferred-selection programs associated with different user identifications in such a manner as to define the relationship between the user identification and the associated preferred-selection program, the selection means being adapted to detect whether for the combination of the detected record-carrier identification and the entered user identification a preferred-selection program is stored in the storage means and to select said preferred program if the presence of such a program is detected.

2. An apparatus as claimed in claim 1, further comprising means for combining the user identification and the record-carrier identification to form an identification code, the storage means being adapted to store the identification codes together with the associated preferred-selection program.

3. An apparatus as claimed in claim 2, for reproducing audio information encoded in conformity with the "Compact Disc Digital Audio" standard, characterized in that the identification means receives a sub-code and is adapted to derive the record carrier identification from those bytes of a index contained in the sub-code which indicate the beginning of the information parts in frames and in seconds, the for combining means being adapted to insert bits of the user identification at unused bit positions of selected bytes.

* * * * *